(12) United States Patent
Jhang et al.

(10) Patent No.: US 6,253,292 B1
(45) Date of Patent: Jun. 26, 2001

(54) DISTRIBUTED SHARED MEMORY MULTIPROCESSOR SYSTEM BASED ON A UNIDIRECTIONAL RING BUS USING A SNOOPING SCHEME

(76) Inventors: Seong Tae Jhang, 103-1611, Wooseong Apt., San 72, Jeongrung 1-Dong, Seongbuk-Gu, Seoul (KR), 136-101; Chu Shik Jhon, 126-601, Keonyoung Apt., Jangan Town, Pundang-Dong, Pundang-Gu, Seongnam-Shi, Kyoungki-Do (KR), 463-030; Hyung Ho Kim, 504-1108, Jukong Apt., Byoulyang-Dong, Guacheon-Shi, Kyoungki-Do (KR), 427-040

( * ) Notice: Subject to any disclaimer, the term of this patent is extended or adjusted under 35 U.S.C. 154(b) by 0 days.

(21) Appl. No.: 09/120,850

(22) Filed: Jul. 22, 1998

(30) Foreign Application Priority Data

Aug. 22, 1997 (KR) .................................................. 97-40083
Apr. 23, 1998 (KR) .................................................. 98-14513

(51) Int. Cl.[7] ...................................................... G06F 12/00
(52) U.S. Cl. ............................ 711/146; 711/148; 709/218
(58) Field of Search ........................................ 711/141, 146, 711/147, 148; 710/128; 709/216, 217, 218, 251

(56) References Cited

U.S. PATENT DOCUMENTS

| 5,566,177 | * | 10/1996 | Bhandari et al. | 370/85.5 |
| 5,588,131 | * | 12/1996 | Borrill | 395/473 |
| 5,781,757 | * | 7/1998 | Deshpande | 395/473 |

* cited by examiner

Primary Examiner—Kevin Verbrugge
(74) Attorney, Agent, or Firm—Anderson Kill & Olick, PC

(57) ABSTRACT

A distributed shared memory multiprocessor system based on a unidirectional ring bus using a snooping scheme comprises a group of processor nodes and a ring bus. The processor nodes are arranged in the form of a ring and one of the processor nodes generates a request signal for a data block, the remaining processor nodes snoop their own internal parts, and one of the remaining processor nodes provides the data block. The ring bus is used for connecting the processor nodes in the form of the ring and providing a path through which the request signal is broadcast to each of the remaining processor nodes and the data block is unicast to the processor node which has generated the request signal for the data block.

13 Claims, 13 Drawing Sheets

DISTRIBUTED SHARED MEMORY MULTIPROCESSOR SYSTEM BASED ON A UNIDIRECTIONAL RING BUS USING A SNOOPING SCHEME

FIELD OF THE INVENTION

The present invention relates to a distributed shared memory multiprocessor system; and, more particularly, to a distributed shared memory multiprocessor system based on a unidirectional ring bus using a snooping scheme.

DESCRIPTION OF THE PRIOR ART

An extensive shared memory multiprocessor system having a single address space and coherent caches provides a flexible and powerful operation environment. The single address space and the coherent caches conveniently implement data partitioning and dynamic load balancing and provide a better environment for a parallel compiler, a standard operating system and multi-programming to thereby make it possible to use a machine with a higher degree of flexibility and efficiency.

Such a shared memory multiprocessor system may be classified into two groups: i.e., a uniform memory access (UMA) multiprocessor, e.g., the multiprocessor 100 shown in FIG. 1; and a non-uniform memory access(NUMA) multiprocessor or distributed shared memory multiprocessor, e.g., the multiprocessor 200 shown in FIG. 2. The UMA multiprocessor 100 of FIG. 1 comprises processor modules, shared memories, an input/output (I/O) system 150 and a system bus 160, wherein only two processor modules 110 and 120 and two shared memories 130 and 140 are depicted for the sake of simplicity. The processor module 110 includes a central processing unit (CPU) 112 and a cache 114 and the processor module 120 includes a CPU 122 and a cache 124.

The shared memories 130 and 140 are commonly accessed by both CPU's 112 and 122, thereby increasing traffics in the system bus 160 connected to the shared memories 130 and 140. The increased traffics in the system bus 160 will in turn increase access delay times to the system bus 160 and to the shared memories 130 and 140.

In order to overcome such defects, the distributed shared memory multiprocessor 200 of FIG. 2 is developed, which comprises processor modules and a system bus 230, wherein only two processor modules 210 and 220 are depicted for the sake of simplicity. The processor module 210 includes a CPU 212, a cache 214, a shared memory 216 and an I/O system 218 and the processor module 220 includes a CPU 222, a cache 224, a shared memory 226 and an I/O system 228.

The distributed shared memory multiprocessor 200 distributes the shared memories 216 and 226 to the respective processor modules 210 and 220 to thereby achieve a short access time for the CPU in each processor module to the corresponding shared memory in said each processor module, i.e., local shared memory, compared with an access time for the same CPU to the other shared memory in the other processor module, i.e., remote shared memory. Thus, memory access times of the CPU are different from each other according to the location of the shared memory to be accessed. The distributed shared memory multiprocessor 200 induces more accesses to the local shared memory than the remote shared memory to thereby alleviate the traffics in the system bus 230 and reduce memory access delays.

Although each of the caches shown in FIGS. 1 and 2 has a smaller capacity than that of the shared memories, the caches provide much shorter access times. This is achieved by reducing the number of access requests to system buses and the shared memories. To be more specific, the number of access requests to the system buses and the shared memories is reduced since the caches store data blocks of the shared memories which are likely to be frequently used by CPU's.

However, the shared memory multiprocessor system based on the bus system has a very strict restriction on the system scalability and the bandwidth of the bus.

In order to alleviate the restriction, an interconnection network comprising a multiplicity of high speed point-to-point links is recommended. Many structures, e.g., a mesh, a torus, a hypercube, a N-cube, a MIN(multi-stage interconnection network), an omega network and a ring structure can be adapted to the interconnection network structure. Among these structures, the ring structure is easy to design and implement. Moreover, while the bus sequentially transmits each transaction, the ring transmits a plural number of transactions at one time to thereby increase the bandwidth.

Meanwhile, when a CPU in a processor module, for example, the CPU 112 in the processor module 110 shown in FIG. 1, performs a write operation on a data block stored at the cache 114 to thereby entail a change in the data block, the change in the data block must be reflected to a corresponding data block in the other cache 124 in the other processor module 120. This kind of problem is, so called, a cache coherence problem.

In general, a snooping scheme for the cache coherence is not adapted to a multiprocessor based on a point-to-point link since there occurs much overhead in applying the snooping scheme to the multiprocessor based on the point-to-point link. But, in a ring based multiprocessor using a unidirectional point-to-point link, the snooping scheme for the cache coherence is more efficient compared with a directory scheme or a SCI (scalable coherence interface) scheme using a double linked list.

Specifically, while a unicast cycles half the ring on the average in the ring based multiprocessor, the broadcast cycles the whole ring on the average to thereby cause twice the cost that the unicast incurs. Since, however, packets to be broadcast are usually request packets with no data, there is not much relation to the utilization of the ring. Moreover, unlike the directory or the SCI scheme, the snooping scheme does not generate extra transactions for cache coherence to thereby reduce the utilization of the ring and the memory access times.

Referring to FIG. 3, there is illustrated an exemplary operation of a distributed shared memory multiprocessor 300 based on a unidirectional ring bus which maintains the cache coherence by using the directory or the SCI scheme. If a processor node PN1 310 fails to read a data block DB 322 from a local cache therein, the PN1 310 unicasts a request packet for the DB 322, i.e., RQ1 312 to a processor node Home 320, wherein a local shared memory in the Home 320 stores the DB 322. The Home 320 unicasts a request packet for an updated data block DB' 332, i.e., RQ2 324 to a processor node PN2 330, wherein DB' 332 is an updated version of the DB 322 and a local cache in the PN2 330 stores the DB' 332 therein. The PN2 330 unicasts the DB' 332 to the Home 320 and the Home 320 updates the DB 322 to DB' 332 to unicast the DB' 332 to the PN1 310.

As is illustrated above, in the multiprocessor system based on the unidirectional ring bus using the directory or the SCI scheme, a data block is transmitted via a processor node whose local shared memory stores the original data block. This inefficiency occurs due to the cache coherence, which causes heavy traffics of the unidirectional ring bus and increase in the memory access times. Accordingly, it is needed to alleviate this problem by means of the snooping scheme.

SUMMARY OF THE INVENTION

It is, therefore, a primary object of the invention to provide a distributed shared memory multiprocessor based on a unidirectional ring bus using a snooping scheme.

In accordance with the present invention, there is provided a distributed shared memory multiprocessor system comprising: a group of processor nodes, wherein the processor nodes are arranged assuming the form of a ring and one of the processor nodes generates a request signal for a data block, the remaining processor nodes snoop their own internal parts, and one of the remaining processor nodes provides the data block; and a ring bus for connecting the processor nodes in the form of the ring and providing a path through which the request signal is broadcast to each of the other processor nodes and the data block is unicast to the processor node which has generated the request signal for the data block.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
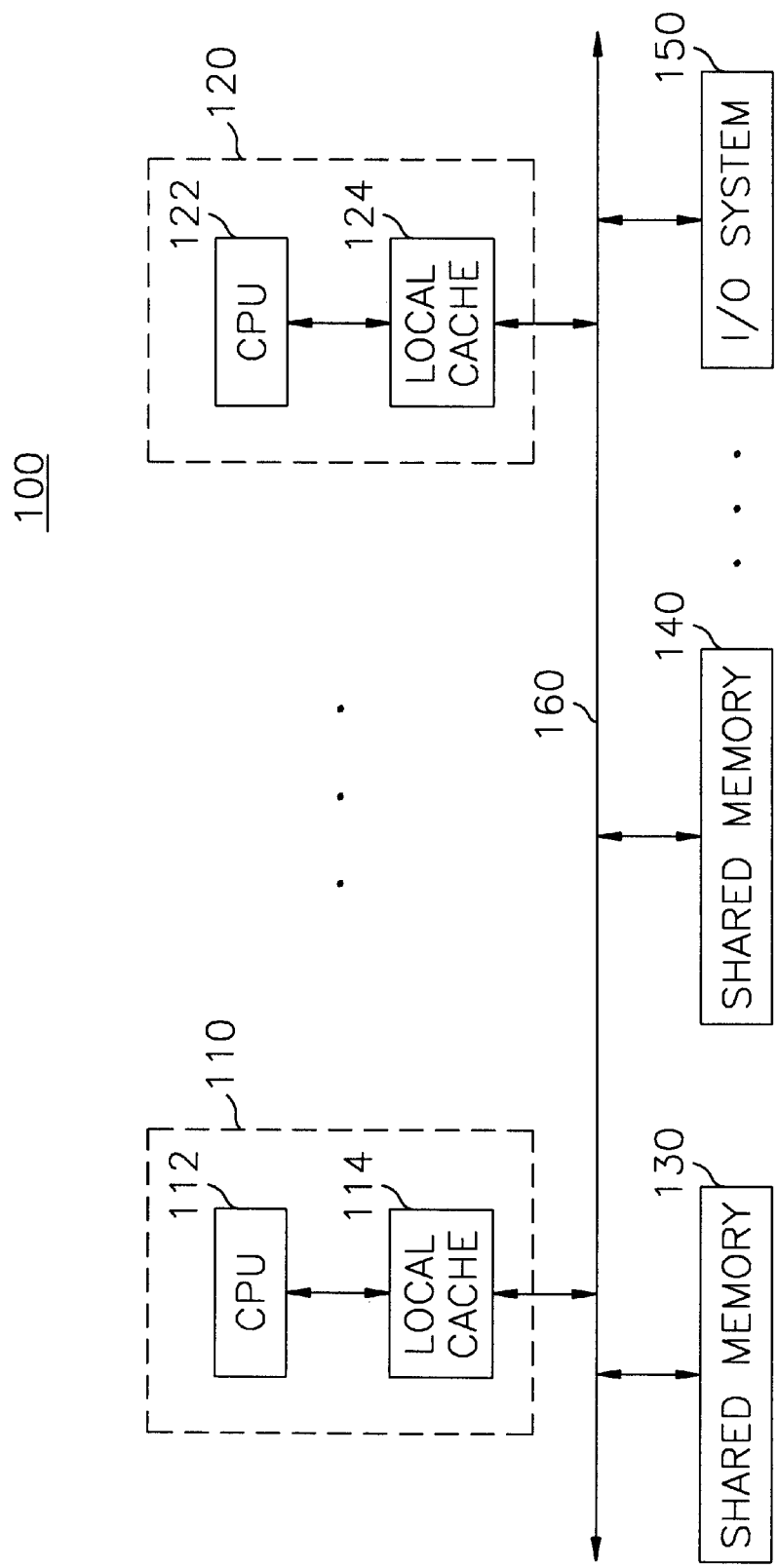
FIG. 1 represents a conventional uniform memory access (UMA) multiprocessor.
Figure 2:
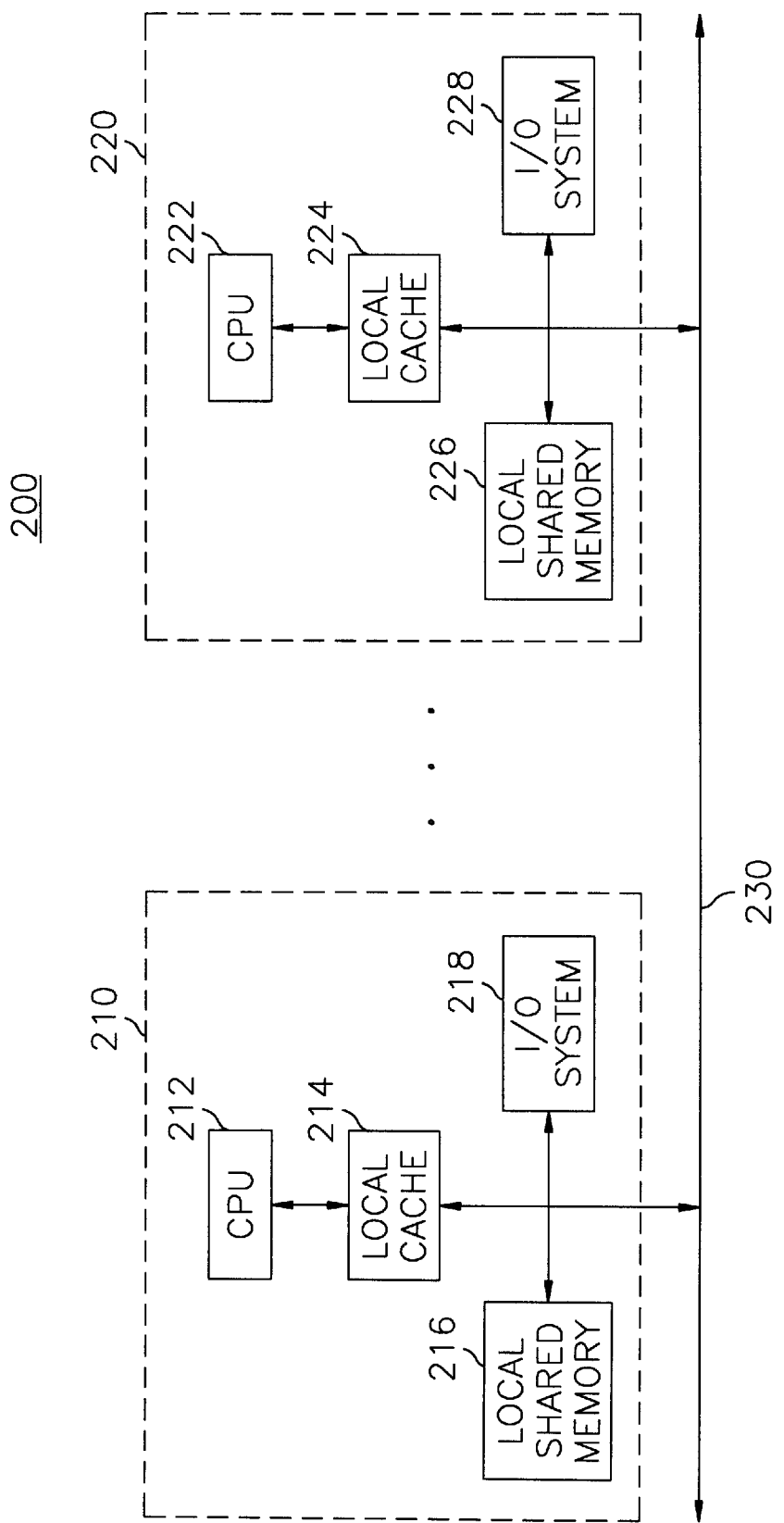
FIG. 2 provides a conventional non-uniform memory access (NUMA) multiprocessor or distributed shared memory multiprocessor.
Figure 3:
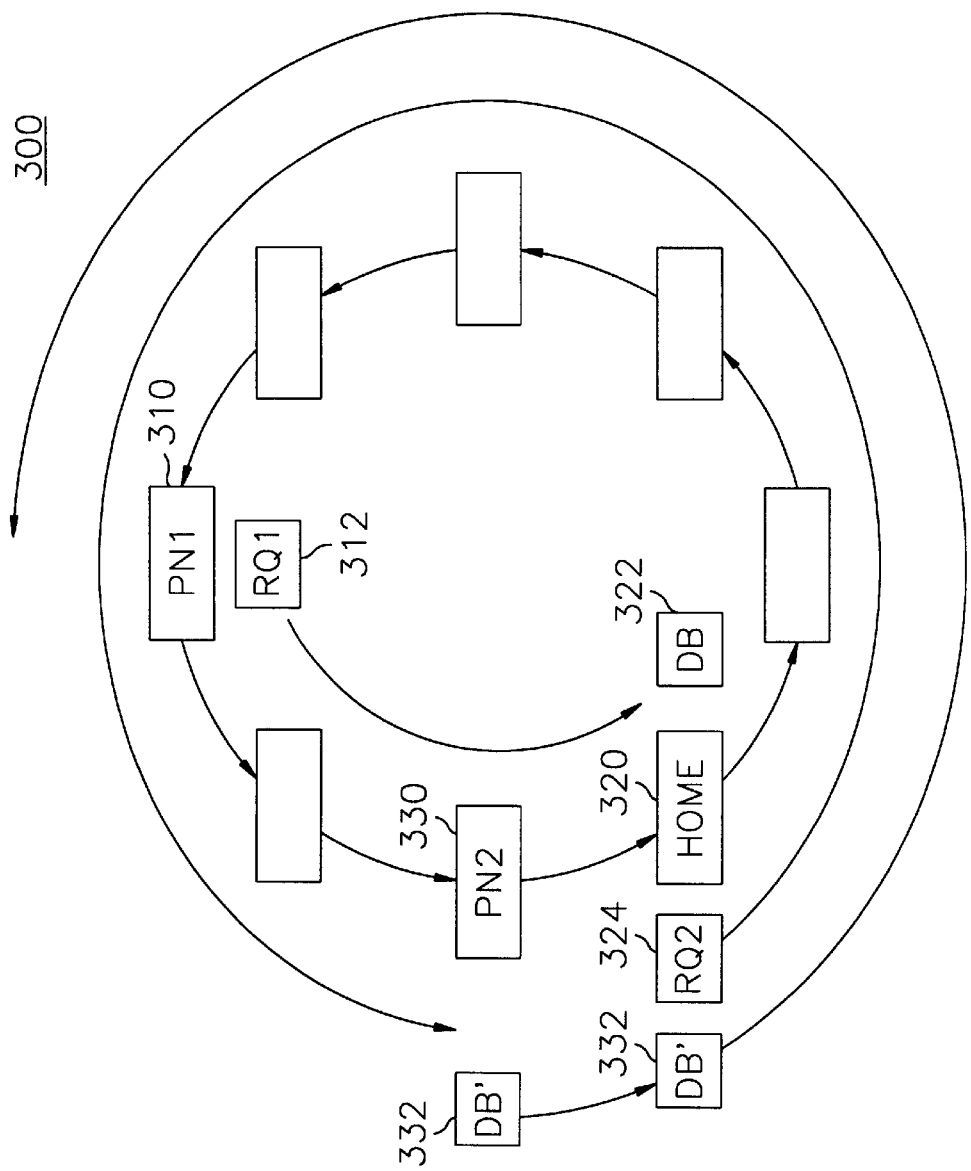
FIG. 3 presents an exemplary operation of a distributed shared memory multiprocessor based on a unidirectional ring bus using the directory scheme.
Figure 4A:
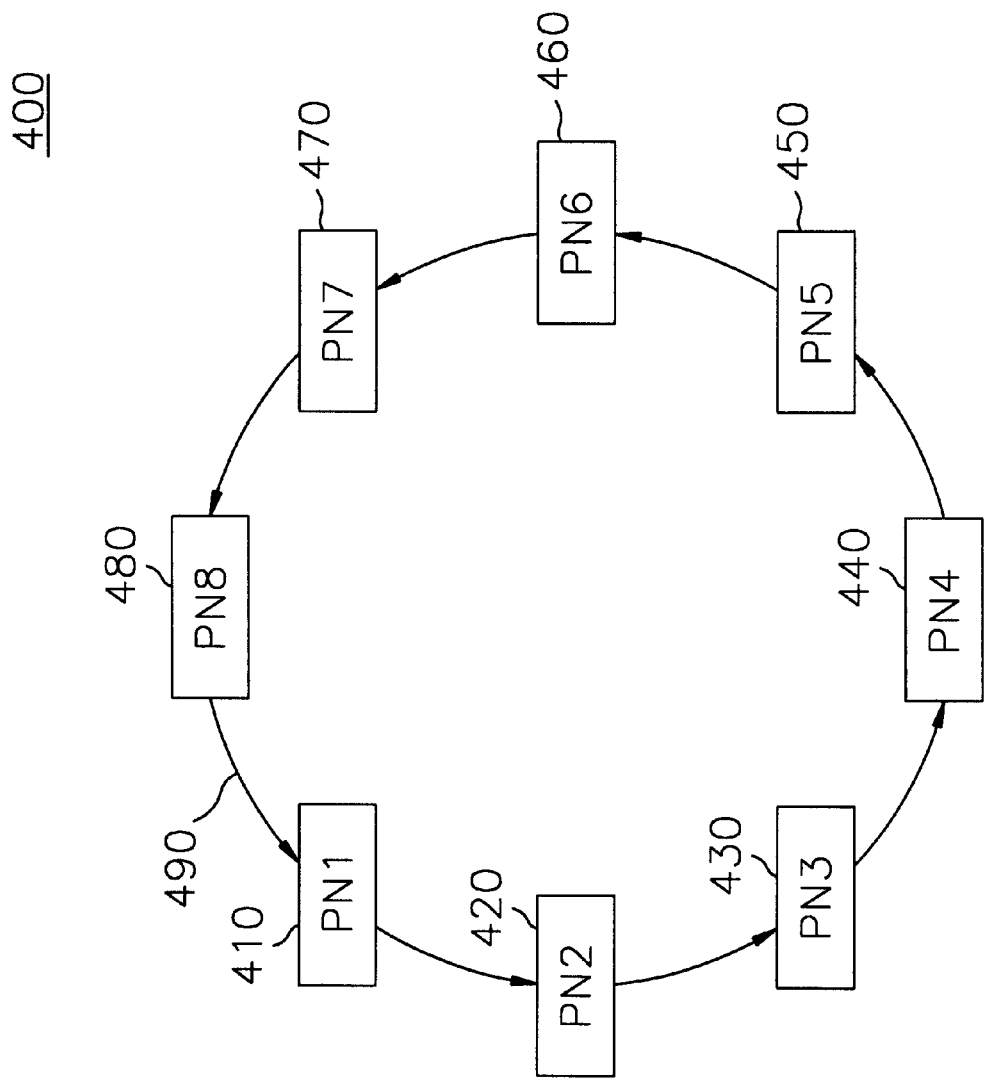
FIG. 4A shows a distributed shared memory based on a unidirectional ring bus using a snooping scheme.

Referring to FIG. 4A, a distributed shared memory multiprocessor 400 based on a unidirectional ring bus 490 supporting a snooping scheme is depicted, wherein the ring bus 490 is implemented by using a point-to-point link and each link of the point-to-point link can be implemented by using an optical fiber, a coaxial cable or a light connection which is able to transmit a multiplicity of signals. In accordance with a preferred embodiment of the present invention, the distributed shared memory multiprocessor 400 comprises 8 processor nodes, i.e., from PN1 410 to PN8 480. The PN1 410 to the PN8 480 are connected through the unidirectional point-to-point ring bus 490.

Figure 4B:
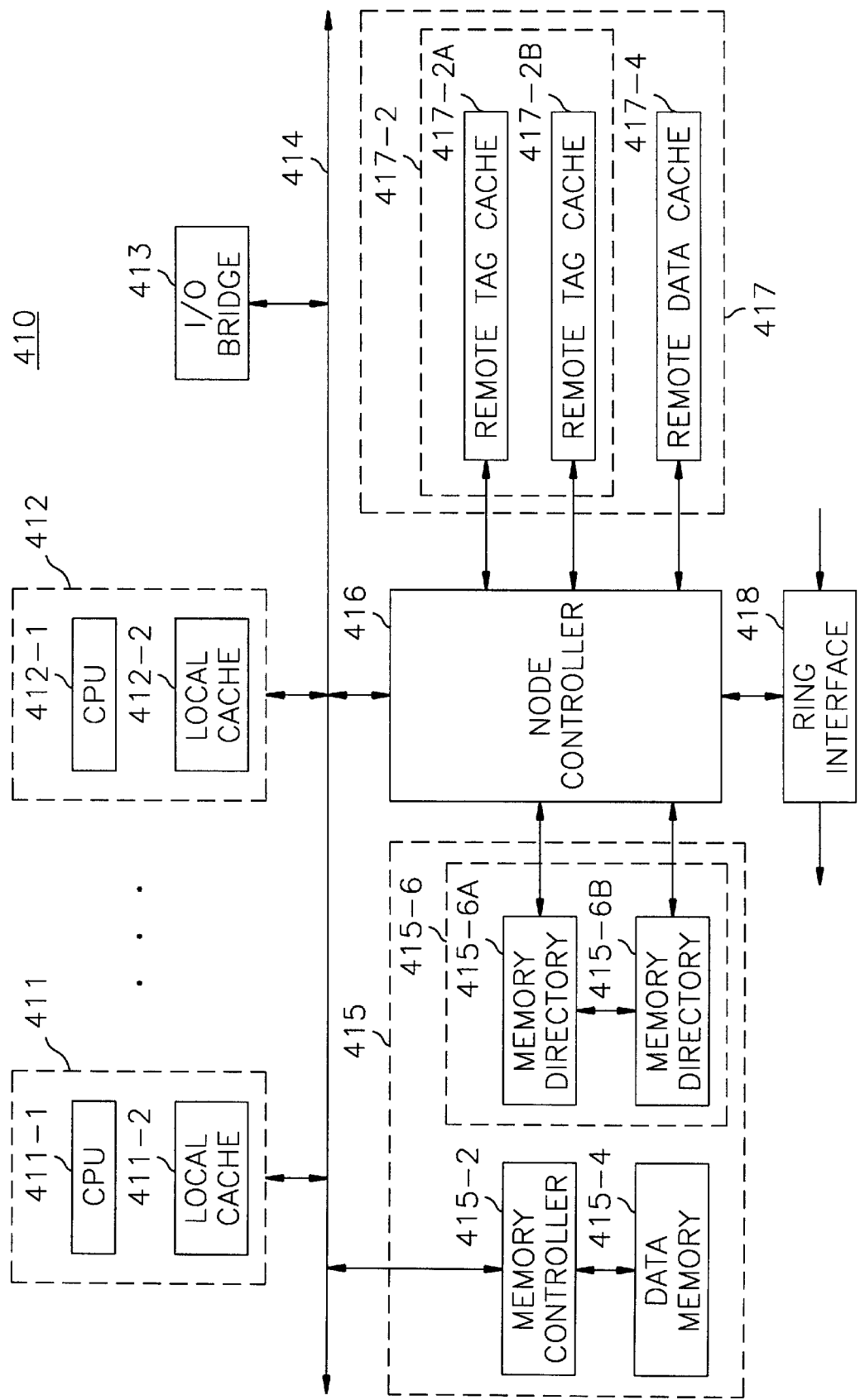
FIG. 4B is a detailed description of the processor node shown in FIG. 4A in accordance with a first preferred of the present invention.

The detailed structure of the PN1 410 is illustrated in FIG. 4B, wherein the PN1 410 includes a plurality of processor modules, an input/output (I/O) bridge 413, a local system bus 414, a local shared memory 415, a node controller 416, a remote cache 417 and a ring interface 418. For the sake of simplicity, only 2 processor modules, i.e., a first processor module 411 and a second processor module 412, are represented, wherein the processor modules 411 and 412 are connected to each other through the local system bus 414. The first processor module 411 has a first central processing unit (CPU) 411-1 and a first local cache 411-2 and the second processor module 412 has a second CPU 412-1 and a second local cache 412-2.

The node controller 416 examines whether a data block responsive to a request from one of the processor modules 411 and 412 is stored at the remote cache 417 or the local shared memory 415 in a valid state. If the data block is stored at the remote cache 417, the node controller 416 provides the data block stored at the remote cache 417 to the corresponding processor module; and if the data block is stored at the local shared memory 415, the local shared memory 415 provides the data block to the corresponding processor module.

If the data block is stored neither at the remote cache 417 nor at the local shared memory 415 in the valid state, the node controller 416 transmits a request for the data block to the other processor nodes 420 to 480 via the ring interface 418. And, when a request for a data block from one of the other processor nodes 420 to 480 is received via the ring interface 418, the node controller 416 examines whether the data block responsive to the request is stored at the remote cache 417 or the local shared memory 415 in a valid state. If the data block is stored at the remote cache 417 or the local shared memory 415 in the valid state, the node controller 416 receives the data block from the remote cache 417 or the local shared memory 415 via the local system bus 414 and makes the data block be transmitted to the processor node which has requested the data block via the ring interface 418.

The ring interface 418 is a data path connecting the PN1 410 to the unidirectional ring bus 490 and controls data flows needed to transmit packets. The ring interface 418 forms packets containing a request from the node controller 416 or a data block to transmit the packets to the other processor nodes 420 to 480 via the unidirectional ring bus 490; and selects requests or data blocks which are provided from the other processor nodes 420 to 480 via the unidirectional ring bus 490 to provide the selected requests or data blocks to the node controller 416. When the ring interface 418 is provided with a broadcast packet, it passes the broadcast packet to a next processor node 420.

The remote cache 417 caches only data blocks stored at remote shared memories of the other processor nodes 420 to

480. If one of the processor modules 411 and 412 connected to the local system bus 414 requests a data block stored at one of the remote shared memories of the other processor nodes 420 to 480 and the data block is not stored at the remote shared memories of the other processor nodes in a valid state, the data block is received via the ring bus 418 and is stored at the remote cache 417. It is possible to quicken the operations by caching data blocks stored at the remote shared memories of the other processor nodes 420 to 480.

The remote cache 417 must satisfy a MLI (multi-level inclusion) property with respect to the local caches 411-2 and 412-2 of the PN1 410 for data blocks stored at the remote shared memories of the other processor nodes 420 to 480. The MLI property is a property that a data block stored at a cache of a lower hierarchy, i.e., a local cache, must be stored at a cache of a higher hierarchy, i.e., a remote cache. To guarantee the MLI property, the data block must not exist at any of the caches of lower hierarchies in a valid state if a data block stored at a cache of a higher hierarchy is replaced.

A snooping filtering responsive to requests for the remote shared memories by the other processor nodes 420 to 480 can be accomplished by the remote cache 417, since the remote cache 417 stores remote data blocks stored at local caches 411-2 and 412-2 of the PN1 410. If a data block responsive to a request from one of the other processor nodes 420 to 480 is not stored at the remote cache 417 in a valid state, a request for the data block is not issued via the local system bus 414 and a snooping filtering process is made.

It is desirable that the remote cache 417 includes a remote data cache 417-4 for storing contents of data blocks and a remote tag cache section 417-2 for storing states and portions of addresses of the data blocks to thereby facilitate updating a state of a data block stored at the remote cache 417 or providing the corresponding data block, if necessary. It is further desired that the remote tag cache section 417-2 contains two remote tag caches, i.e., a first remote tag cache 417-2A and a second remote tag cache 417-2B, for storing addresses and states of remote data blocks. The first remote tag cache 417-2A is to respond to a remote cache access request by one of the processor modules 411 and 412; and the second remote tag cache 417-2B is to respond to a remote cache access request by one of the other processor nodes 420 to 480. In this way, access requests to the remote cache 417 can be processed in parallel.

Data blocks stored at the remote cache 417 are represented by one of 4 states, i.e., "Modified", "Modified-Shared", "Shared" and "Invalid". Each of the 4 states is described below.

Modified: A corresponding data block is valid, updated and the only valid copy.

Modified-Shared: A corresponding data block is valid, updated and the other remote cache can share the corresponding data block.

Shared: A corresponding data block is valid and the other remote cache can share the corresponding data block.

Invalid: A corresponding data block is not valid.

The local shared memory 415 contains a data memory 415-4, a memory controller 415-2 and a memory directory cache 415-6. The data memory 415-4 stores contents of data blocks and the memory directory cache 415-6 stores states of the data blocks.

The memory controller 415-2, in response to requests from the processor modules 411 and 412 and the node controller 416, directly accesses the data memory 415-4, and then, provides data blocks corresponding to the requests to the processor modules 411 and 412 and the node controller 416, wherein the memory controller 415-2 is connected to the node controller 416 through the local system bus 414.

The memory directory cache 415-6 is implemented to be directly accessed by the node controller 416. Accordingly, it can be efficiently examined in what state a data block requested by one of the processor modules 411 and 412 is stored at the local shared memory 415 and in what state a data block requested by one of the other processor nodes 420 to 480 is stored at the local shared memory 415. It is desirable that the memory directory cache 415-6 is provided with a first memory directory 415-6A and a second memory directory 415-6B. The first memory directory 415-6A is to respond to remote shared memory access requests by the processor modules 411 and 412 via the local system bus 414; and the second memory directory 415-6B is to respond to remote shared memory access requests by the other processor nodes 420 to 480 via the ring interface 418. In this way, access requests to the local shared memory 415 can be processed in parallel.

The first memory directory 415-6A maintains one of 3 states, i.e., CL(clean), SH(share) and GN(gone), in order to minimize the amount of cache coherence traffics in response to local shared memory access requests via the local system bus 414, to process requests from the local system bus 414 and to generate a snooping result in response to a snooping request by the ring bus 490. Each of the 3 states is illustrated below.

CL: A corresponding data block is not stored at a remote cache of one of the other processor nodes in a valid state.

SH: A corresponding data block is valid and can be stored at a remote cache of one of the other processor nodes in a non-updated state.

GN: A corresponding data block is not valid and stored at a remote cache of one of the other processor nodes in an updated and valid state.

Meanwhile, all communications on the unidirectional point-to-point ring bus 490 sequentially connecting the processor nodes 420 to 480 are accomplished in packet forms, wherein packets are classified into request packets, response packets and acknowledge packets. The request packet is sent by one of the processor nodes 410 to 480 requiring a transaction to the ring bus 490 and is classified into broadcast packets and unicast packets. Only the broadcast packets are snooped by the other processor nodes.

The response packet is sent by a processor node which has received a request packet and is always unicast. The acknowledge packet is generated by a processor node which has received the response packet and is unicast to the processor node which has sent the response packet. The processor node which unicasts the response packet keeps the response packet until the acknowledge packet corresponding to the response packet is received. When a request for the same data block by one of the other processor nodes is received before the acknowledge packet corresponding to the response packet is received, a packet requiring the same one of the other processor nodes to make the request packet once more is transmitted, if necessary.

In more detail, broadcast packets among the request packets can be classified into one of MRFR(memory read for read), MFLSH(memory flash), MRFW(memory read for write) and MINV(memory invalidate) and unicast packets among the request packets can be classified into one of MWBE(memory writeback exclusive), MWBS(memory writeback shared) and MRPLY(memory reply).

MRFR: a packet which is sent when a data block responsive to a read request from a processor in a processor node corresponds to a remote shared memory and the data block is not stored at a remote cache in a valid state.

MFLSH: a packet which is sent when a data block responsive to a read request from a processor in a processor node corresponds to a local shared memory and is not stored at the processor node in a valid state.

MRFW: a packet which is sent when a data block responsive to a write request from a processor in a processor node is not stored at a remote cache or a local shared memory in a valid state.

MINV: a packet which is sent when a data block responsive to a write request from a processor in a processor node is stored at a remote cache or a local shared memory in a valid state and the data block is shared by a remote cache in the other processor node.

MWBE: a packet which is sent when a data block to be replaced is stored at a remote cache in "Modified" state.

MWBS: a packet which is sent when a data block to be replaced is stored at a remote cache in "Modified-Shared" state.

MRPLY: a data provision response transaction in response to a request packet.

Figure 5:
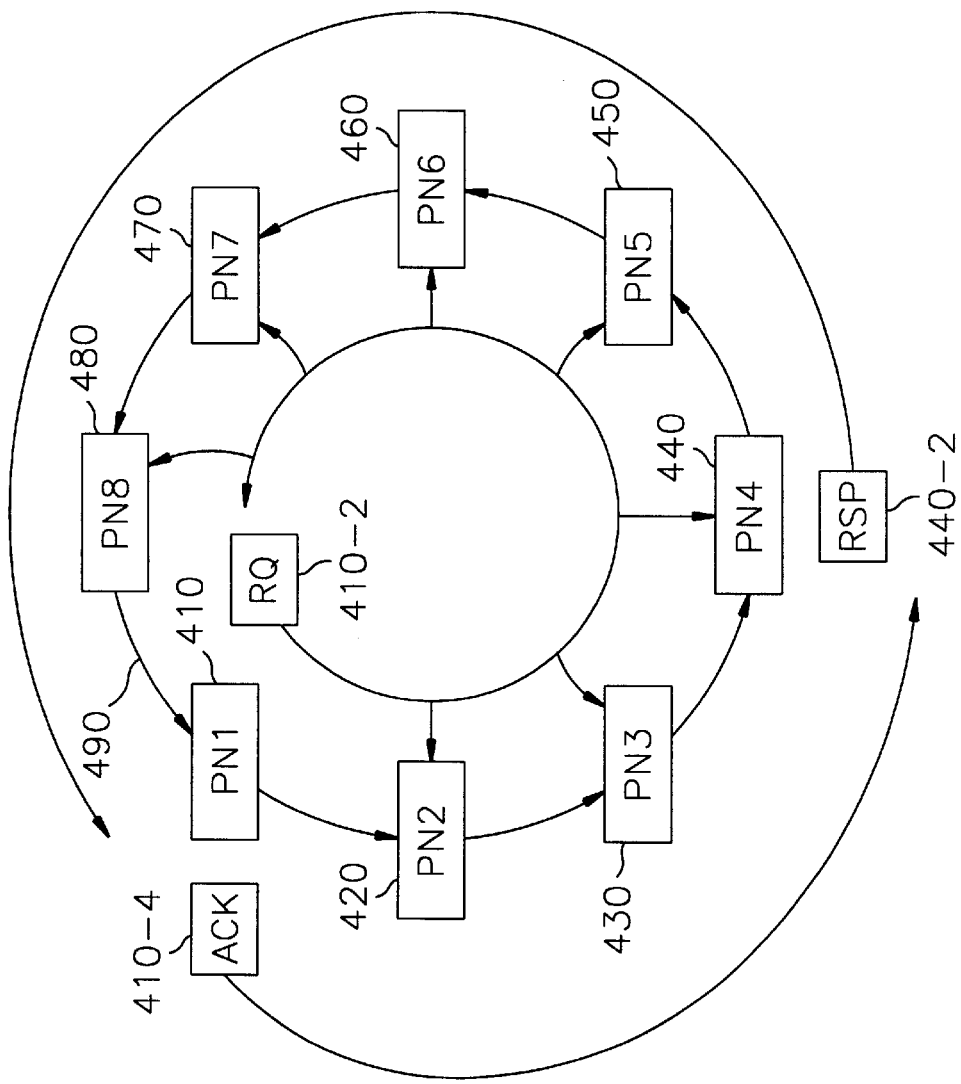
FIG. 5 illustrates an exemplary operation of the distributed shared memory based on the unidirectional ring bus using the snooping scheme.

Referring to FIG. 5, an exemplary operation of the distributed shared memory multiprocessor based on the unidirectional ring bus using the snooping scheme is illustrated. A first case is when the first processor module 411 in the PN1 410 makes a read request for a data block, wherein the request packet is RQ 410-2. If the data block corresponds to a remote shared memory and is not stored at the remote cache 417 of the PN1 410 in a valid state, the PN1 410 broadcasts the RQ 410-2 of MRFR to the other processor nodes 420 to 480 via the ring bus 490. And if the data block corresponds to a local shared memory and is not stored at the PN1 410 in a valid state, the PN1 410 broadcasts the RQ 410-2 of MFLSH to the other processors 420 to 480 via the ring bus 490.

The RQ 410-2 from the PN1 410 makes a tour starting from the PN2 420 to the PN8. While the RQ 410-2 goes around the ring bus 490, each processor node examines its remote cache or memory directory cache in response to the RQ 410-2 to snoop a state of the data block and passes the RQ 410-2 to a next processor node.

For example, if the RQ 410-2 is applied to a PN4 440, a node controller of the PN4 440 snoops a remote cache or a memory directory cache in the PN4 440. If the data block is stored at the remote cache of the PN4 440 in a "Modified" or "Modified-Shared" state, the node controller of the PN4 takes the responsibility for the response to the RQ 410-2, wherein there is no processor node whose local shared memory stores the data block in a valid state, in this case.

Thereafter, the node controller of the PN4 440 unicasts a response packet RSP 440-2 including the data block to the PN1 410. Furthermore, the node controller of the PN4 440 maintains a state of the remote tag cache section as a "Modified-Shared" state in response to the RQ 410-2 of MRFR and as a non-updated and valid state, such as, a "Shared" state, in response to the RQ 410-2 of MFLSH.

If the data block is stored at a local shared memory of the PN4 440 in a valid state, the node controller of the PN4 takes the responsibility for the response to the RQ 410-2 to provide a request to a memory controller of the PN4 440 via a local system bus of the PN4 440. The memory controller of the PN4 440, in response to the request, accesses a data memory of the PN4 440 to provide the data block to the node controller of the PN4 440 via the local system bus of the PN4 440. Thus, the node controller of the PN4 440 unicasts the RSP 440-2 including the data block to the PN1 410 via a ring interface of the PN4 440.

The RQ 410-2 is removed by the PN1 410 after finishing the tour. The PN1 410 unicasts an acknowledge packet ACK 410-4 to the PN4 440 and provides the data block in the RSP 440-2 to the first processor module 411 which has issued the read request for the data block, after receiving the RSP 440-2. If the data block corresponds to a remote shared memory, the PN1 410 stores the data block at the remote data cache 417-4 and makes the state of the remote tag cache section 417-2 corresponding to the data block a valid state; and if the data block corresponds to the local shared memory 415, the PN1 410 stores the data block at the data memory 415-4 in the local shared memory 415 and makes the state of the memory directory cache 415-6 a state representing that the other processor nodes share the data block, such as, a SH state.

A second case is when the first processor module 411 in the PN1 410 makes a write request for a data block, wherein FIG. 5 is still valid for this case and the request packet is RQ 410-2, for the sake of simplicity. If the PN1 410 does not store the data block at the remote cache 417 or the local shared memory 415 of the PN1 410 in a valid state, the PN1 410 broadcasts the RQ 410-2 of MRFW to the other processor nodes 420 to 480 via the ring bus 490.

While the RQ 410-2 goes around the ring bus 490, each processor node examines its remote cache or memory directory cache in response to the RQ 410-2 to snoop a state of the data block and passes the RQ 410-2 to a next processor node. For example if the RQ 410-2 is applied to the PN4 440, a node controller of the PN4 440 snoops a remote cache or a memory directory cache in the PN4 440. If the data block is stored at the remote cache of the PN4 440 in an updated state, e.g., a "Modified" or "Modified-Shared" state or at the local shared memory in a valid state, the node controller of the PN4 440 takes the responsibility for the response to the RQ 410-2, wherein there is no processor node whose local shared memory stores the data block in a valid state, when the data block is stored at the remote cache of the PN4 440 in a "Modified" or "Modified-Shared" state.

Thereafter, the node controller of the PN4 440 unicasts a response packet RSP 440-2 including a data block to the PN1 410. Furthermore, the node controller of the PN4 440 makes a state of the remote tag cache section as an invalid state, e.g., an "Invalid" state or a state of the memory directory cache as an invalid state, such as a "GN" state. The RQ 410-2 is removed by the PN1 410 after finishing the tour. Meanwhile, if the data block is stored at the remote cache of the other processor nodes, i.e., the PN2 420 to the PN3 430 and the PN5 450 to the PN8 480, in a non-updated and valid state, e.g., a "Shared" state, the state of the remote cache of the PN4 440 is changed into an invalid state, e.g. an "Invalid" state.

The PN1 410 unicasts an acknowledge packet ACK 410-4 to the PN4 440 and provides the data block in the RSP 440-2 to the first processor module 411 which has made the read request for the data block. If the data block corresponds to a remote shared memory, the PN1 410 stores the data block at the remote data cache 417-4 as an updated and valid state, e.g., a "Modified" state; and if the data block corresponds to the local shared memory 415, the PN1 410 stores the data block at the data memory 415-4 in the local shared memory 415 and makes the state of the memory directory cache 415-6 a state representing that there is no remote cache in the other processor nodes which share the data block, such as, a "CL" state.

A third case is when the first processor module 411 in the PN1 410 makes a write request or a invalidate request for a data block, wherein FIG. 5 is still valid for this case and the request packet is RQ 410-2, for the sake of simplicity. If the PN1 410 stores the data block at the remote cache 417 or the local shared memory 415 of the PN1 410 in a valid state and a local shared memory or a remote cache of one of the other processor nodes also stores the data block in a valid state, the PN1 410 broadcasts the RQ 410-2 of MINV to the other processor nodes 420 to 480 via the ring bus 490.

While the RQ 410-2 goes around the ring bus 490, each processor node examines its remote cache or memory directory cache in response to the RQ 410-2 to snoop a state of the data block and passes the RQ 410-2 to a next processor node. For example, if the RQ 410-2 is applied to the PN4 440, a node controller of the PN4 440 snoops a remote cache or a memory directory cache in the PN4 440. If the data block is stored at the remote cache of the PN4 440 in a "Modified-Shared" state or at the local shared memory in a valid state, the node controller of the PN4 takes the responsibility for the response to the RQ 410-2, wherein there is no processor node whose local shared memory stores the data block in a valid state, when the data block is stored at the remote cache of the PN4 440 in a "Modified-Shared" state.

Thereafter, the node controller of the PN4 440 unicasts a response packet RSP 440-2 which does not contain the data block to the PN1 410. Furthermore, the node controller of the PN4 440 makes a state of the remote tag cache section as an invalid state, e.g., an "Invalid" state or a state of the memory directory cache as an invalid state, such as a "GN" state. The RQ 410-2 is removed by the PN1 410 after finishing the tour. Meanwhile, if the data block is stored at the remote cache of the other processor nodes, i.e., the PN2 420 to the PN3 430 and the PN5 450 to the PN8 480, in a nonupdated and valid state, e.g., a "Shared" state, the state of the remote cache of the PN4 440 is changed into an invalid state, e.g. an "Invalid" state.

The PN1 410 unicasts an acknowledge packet ACK 410-4 to the PN4 440, after receiving the RSP 440-2. If the data block corresponds to a remote shared memory, the PN1 410 makes the state of the data block stored at the remote data cache 417-4 an updated state, e.g., a "Modified" state; and if the data block corresponds to the local shared memory 415, the PN1 410 makes the state of the memory directory cache 415-6 a state representing that there is no remote cache in the other processor nodes which share the data block, such as, a "CL" state.

A fourth case is when a state of a data block to be expelled by data block replacement is an updated state, e.g., a "Modified" or a "Modified-Shared" state, wherein FIG. 5 is slightly modified to be valid for this case. In detail, the RQ 410-2 is not broadcast to each of the processor nodes, i.e., the PN2 420 to the PN8 480, but unicast only to one processor node. The PN1 410 unicasts a request packet RQ 410-2 of MWBE or MWBS to a processor node whose local shared memory stores the data block, e.g., the PN4 440. Then, the PN4 440 updates its data memory and memory directory cache in response to the RQ 410-2 and unicasts a response packet RSP 440-2 to the PN1 410. The PN1 410 unicasts an acknowledge packet ACK 410-4 to the PN4 440.

Figure 6:
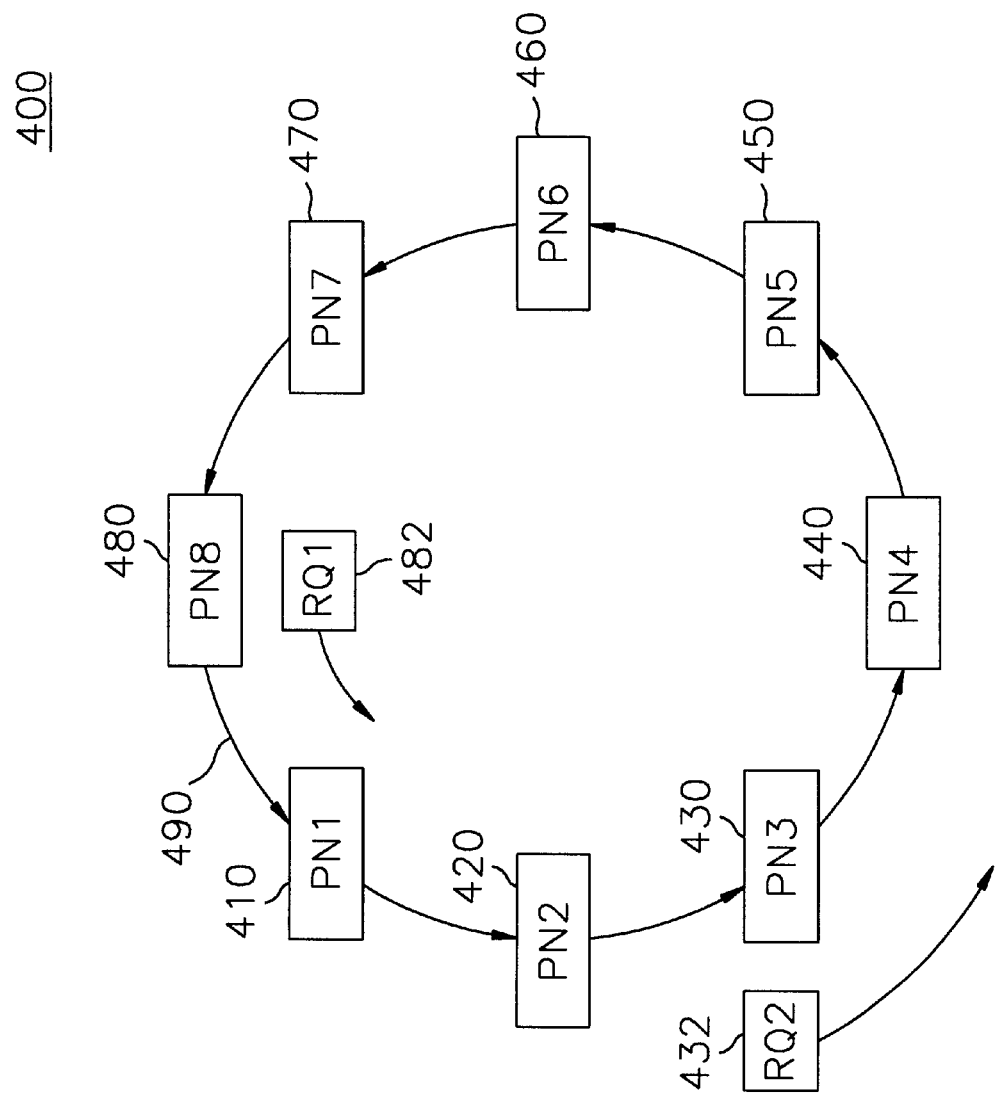
FIG. 6 describes snooping requests generated by the two processor nodes shown in FIG. 4A.

Meanwhile, unlike the conventional bus, a processor node in accordance with a preferred embodiment of the present invention can observe a multiplicity of packets in an order different from that of the other processor nodes. FIG. 6 depicts a case when the PN8 480 generates a first request packet RQ1 482 and then the PN3 430 generates a second request packet RQ2 432. The PN2 420 observes the RQ1 482 first and then the RQ2 432; and the PN7 470 observes the RQ2 432 first and then the RQ1 482. Thus, from the processor's point of view, the snooping order is not correlated with the order that the corresponding request is processed and the processor node determines the change of the state with its local information.

The order to process a plural number of request packets for an identical address is determined in the sequence of the request packet arrival at an ownership processor node, wherein the ownership processor node is a node which stores a data block corresponding to the request packet at its remote cache in an updated state, e.g., "Modified" or "Modified-Shared" state or which stores the data block at its local shared memory in a valid state. Thus, all the processor nodes that transfer requests via the ring bus are provided with a response packet or a retry packet from the ownership processor node. The ownership processor node transmits the RSP packet including a data block responsive to a MRFR, a MFLSH or a MRFW request packet to the corresponding processor node by using a MRPLY packet and transmits a response packet which does not contain a data block responsive to a MINV request packet. If a request packet for the same data block is received from one of the other processor nodes before receiving an acknowledge packet for the data block, the ownership processor node transmits a retry packet requiring the same one of the other processor nodes to make the request packet once more.

Referring to FIGS. 7 to 11, there are exemplified detailed descriptions of the processor node shown in FIG. 4A in accordance with a second to sixth embodiments of the present invention.

Figure 7:
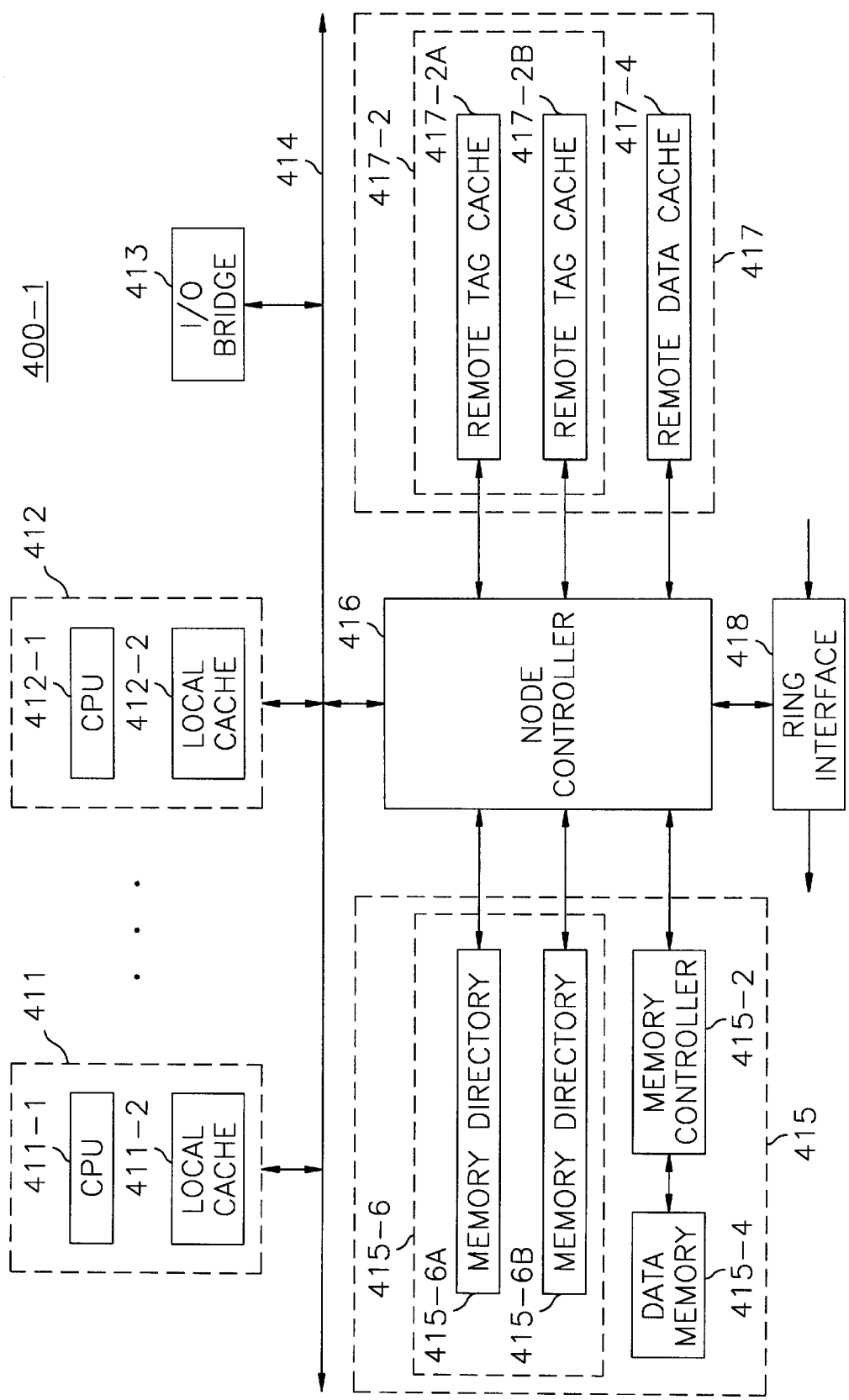
FIG. 7 offers a detailed description of the processor node shown in FIG. 4A in accordance with a second preferred embodiment of the present invention.

FIG. 7 exemplifies a detailed description of the processor node 400-1 in accordance with a second embodiment of the present invention, wherein the memory controller 415-2 in the local shared memory 415 is directly connected to the node controller 416. The node controller 416 examines whether a data block corresponding to a request is stored at a remote cache 417 or a local shared memory 415 in a valid state. If the data block is stored at the remote cache 417 in a valid state, the node controller 416 provides the data block stored at the remote cache 417 to the processor module which has generated the request; and if the data block is stored at the local shared memory 415 in a valid state, the node controller 416 provides the data block stored at the local shared memory 415 to the processor module. If the data block is not stored at the remote cache 417 or the local shared memory 415 in a valid state, the node controller 416 transmits a request for the data block to the other processor nodes, i.e., the PN2 420 to the PN8 480, via the ring interface 418.

In addition to this, if a request for a data block is provided from one of the processor nodes, i.e., the PN2 420 to the PN8 480, the node controller 416 examines whether the data block is stored at the remote cache 417 or the local shared memory 415 in a valid state. If the data block is stored at the remote cache 417 or the local shared memory 415 in a valid state, the node controller 416 transmits the data block to the corresponding processor node via the ring interface 418.

Figure 8:
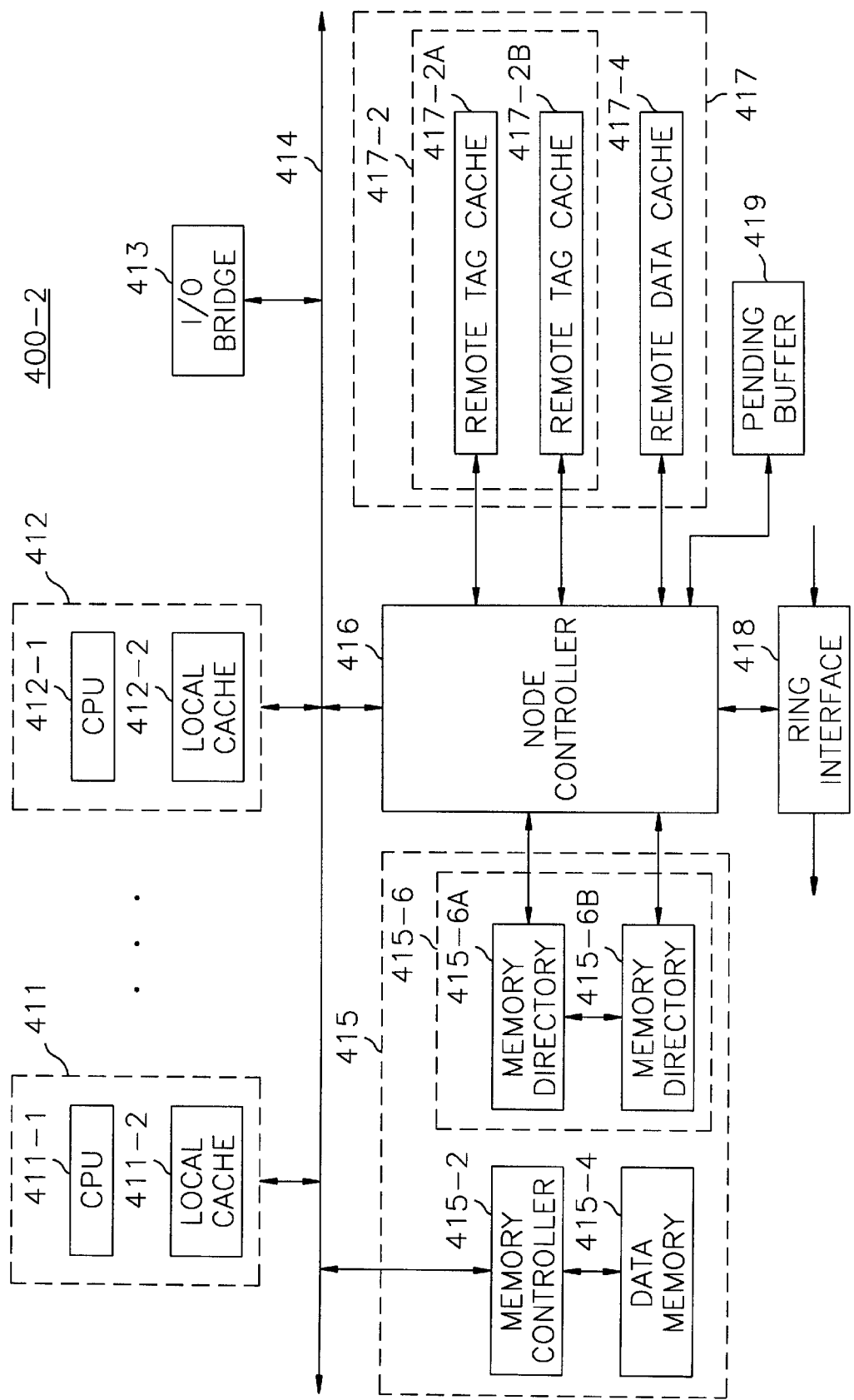
FIG. 8 explains in detail the processor node shown in FIG. 4A in accordance with a third preferred embodiment of the present invention.

FIG. 8 exemplifies a detailed description of the processor node 400-2 in accordance with a third embodiment of the present invention, wherein a pending buffer 419 is equipped for storing information of a request for a data block when a MRPLY packet for the data block has transferred and an acknowledge packet therefor has not received yet. This processor node refers the pending buffer 419 as well as a memory directory cache 415-6 for a local shared memory 415 and a remote tag cache section 417-2 for the remote cache 417 in snooping to thereby transmit a packet requiring a retrial when the request is for a data block stored at the pending buffer 419.

Figure 9:
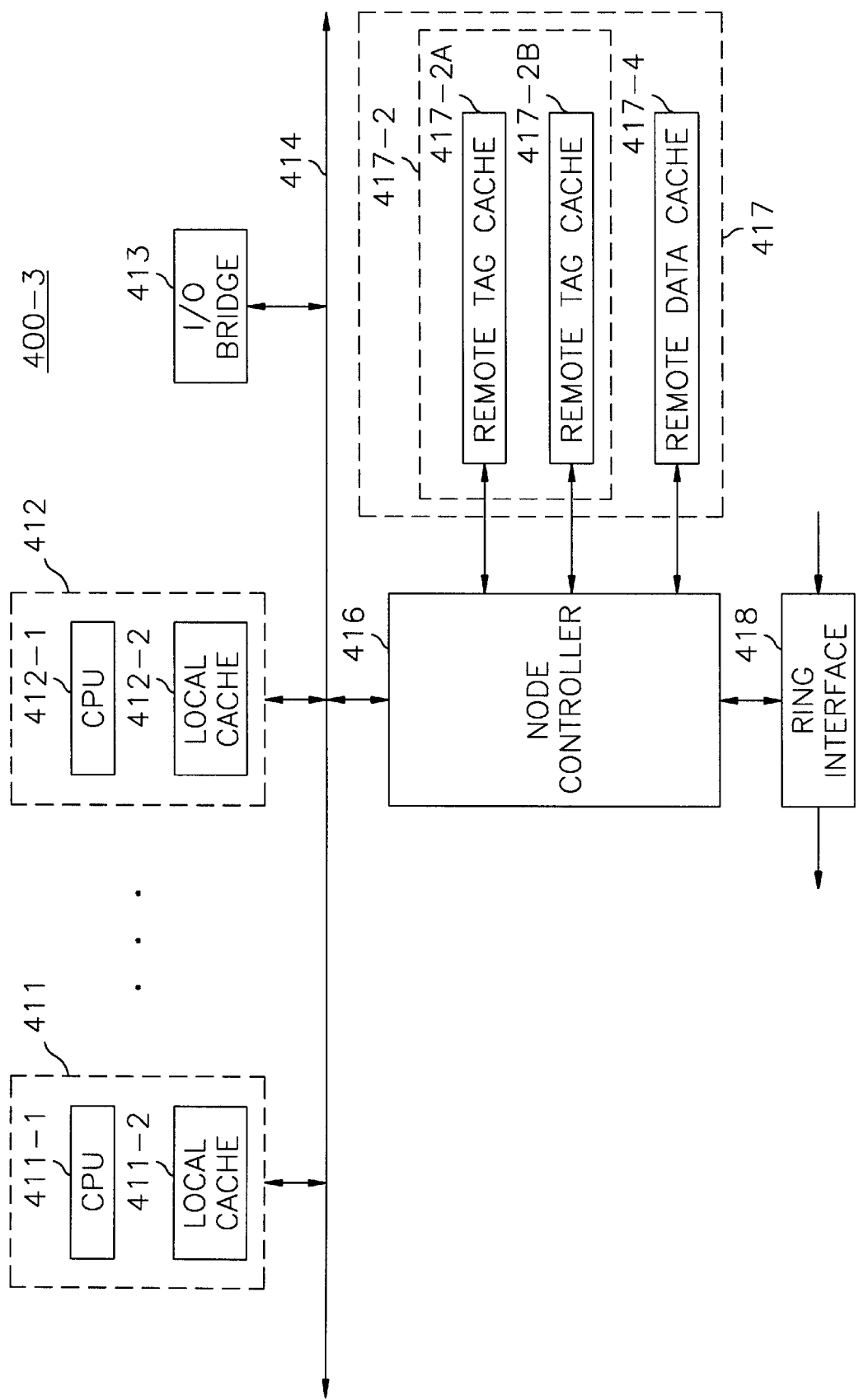
FIG. 9 exhibits in detail the processor node shown in FIG. 4A in accordance with a fourth preferred embodiment of the present invention.

FIG. 9 exemplifies a detailed description of the processor node 400-3 in accordance with a fourth embodiment of the present invention. The processor node 400-3 includes a multiple number of processor modules, a node controller 416, a remote cache 417, a ring interface 418 and an I/O bridge 413, wherein only two processor modules 411 and 412 are illustrated, for the sake of simplicity.

Figure 10:
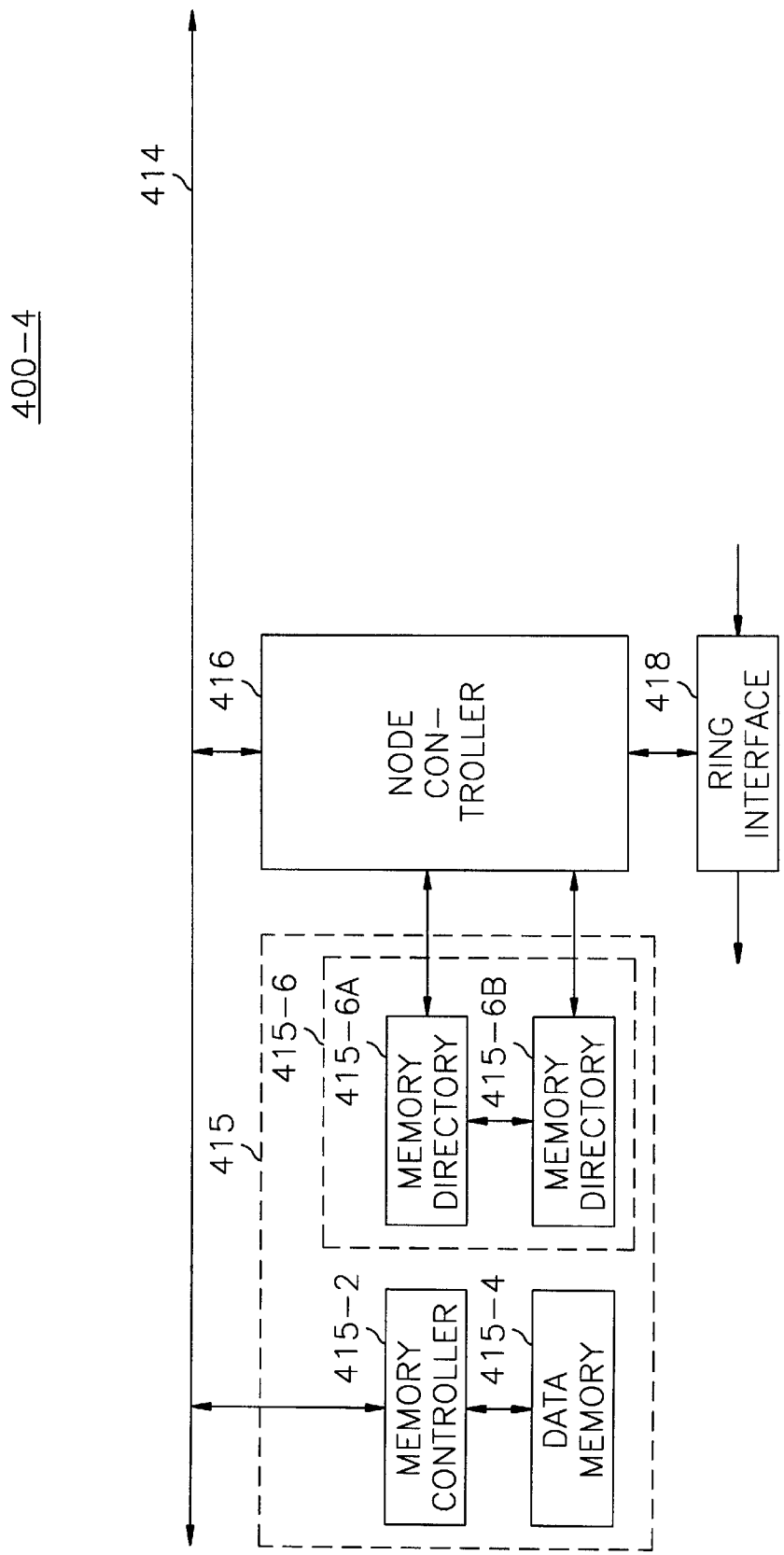
FIG. 10 displays in detail the processor node shown in FIG. 4A in accordance with a fifth preferred embodiment of the present invention.

FIG. 10 exemplifies a detailed description of the processor node 400-4 in accordance with a fifth embodiment of the present invention, wherein the processor node 400-4 includes a node controller 416, a local shared memory 415 and ring interface 418.

Figure 11:
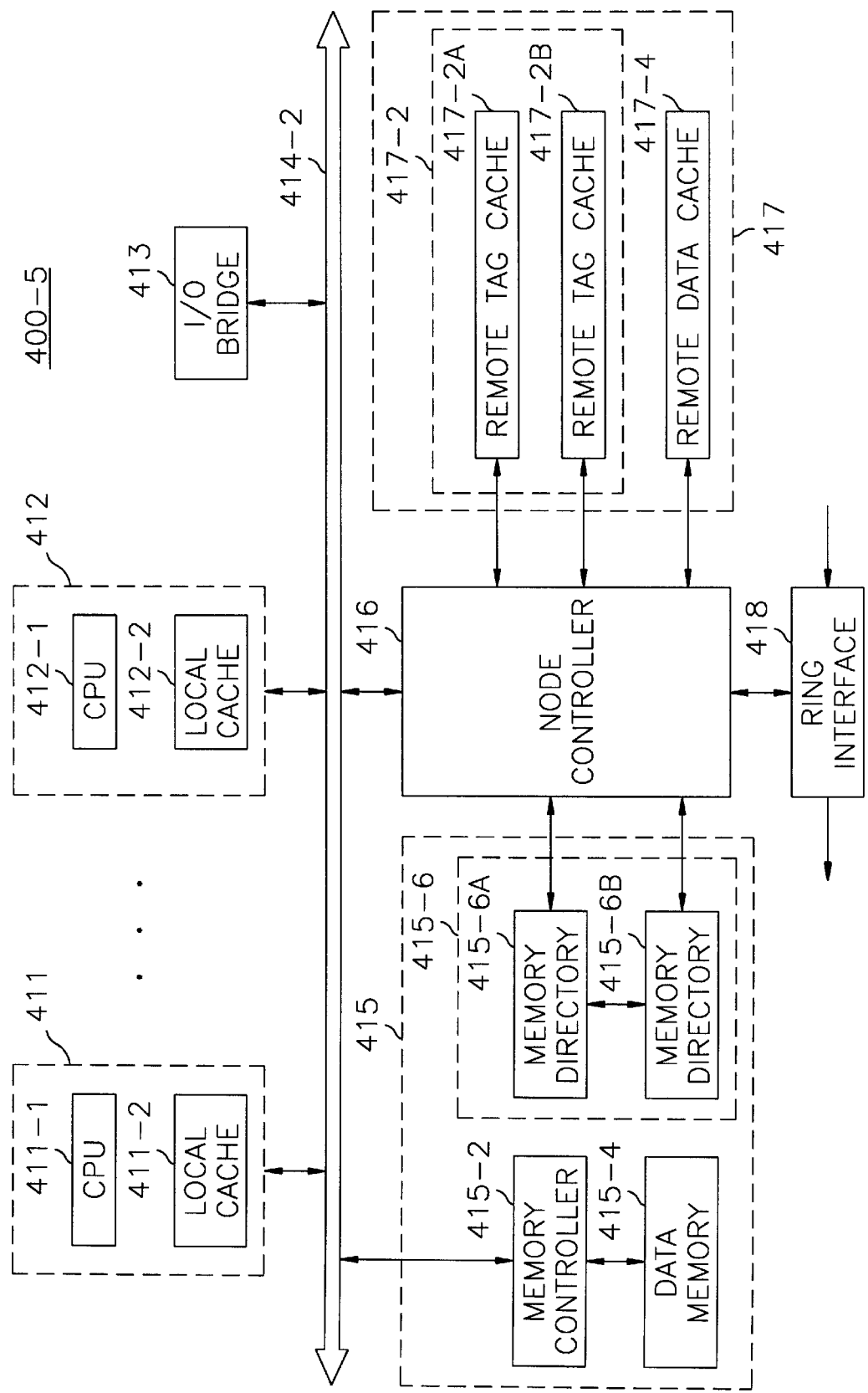
FIG. 11 pictorializes in detail the processor node shown in FIG. 4A in accordance with a sixth preferred embodiment of the present invention.

FIG. 11 exemplifies a detailed description of the processor node 400-5 in accordance with a sixth embodiment of the present invention, wherein the processor modules are connected with each other by an arbitrary interconnection network 414-2.

Figure 12:
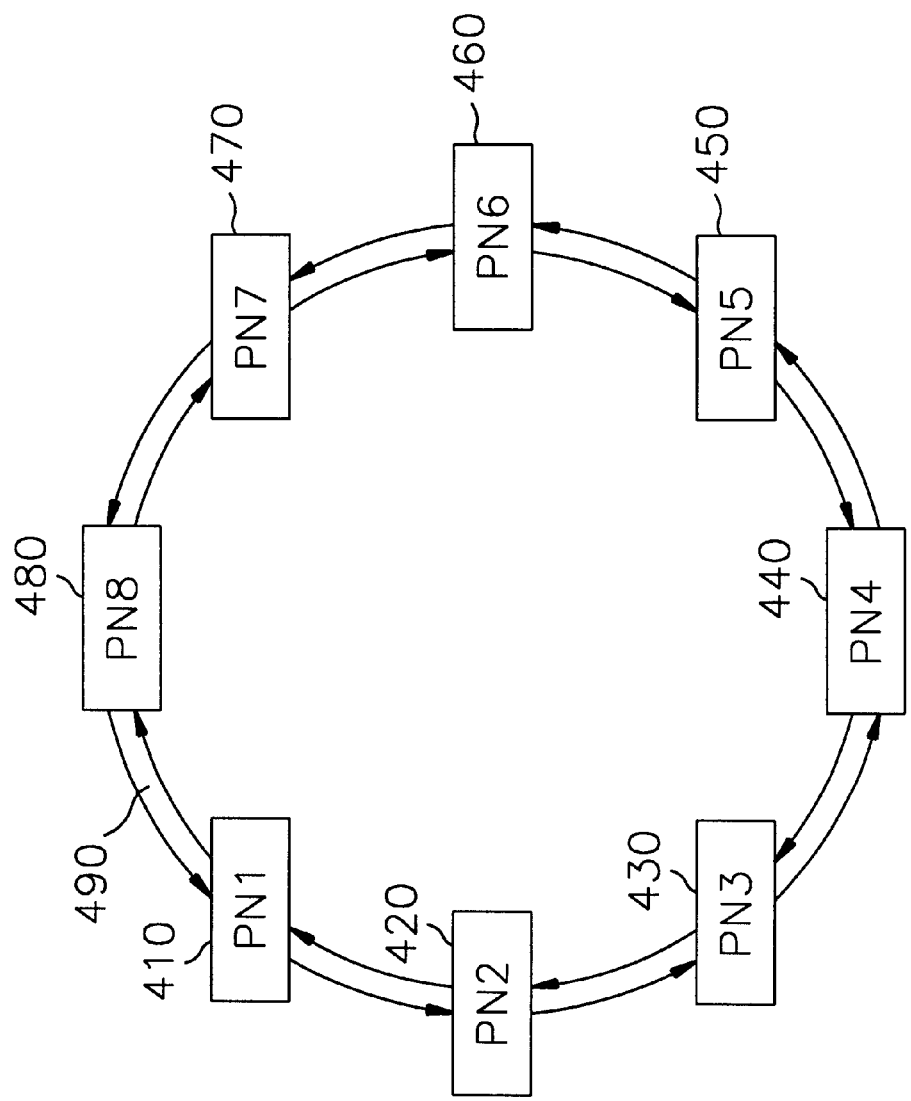
FIG. 12 depicts a distributed shared memory multiprocessor based on unidirectional ring buses using a snooping scheme.

FIG. 12 depicts a distributed shared memory multiprocessor based on two unidirectional ring buses, wherein bidirectional transmission can be realized.

Although it is respectively explained for MWBE and MWBS in the case of block replacement and for MRFR and MFLSH in the case of block read, the same method can be adapted to the case when MWBE and MWBS are merged into one request and MRFR and MFLSH are merged into one request.

Moreover, although it is respectively explained for the case when the state of the remote cache is "Modified", "Modified-Shared", "Shared" and "Invalid", the same method can be adapted to the case when the state of the remote cache is one of the other states that are not explained in the preferred embodiment. In addition to this, a request can be generated based not only on a block but also on a word and the state of a memory directory can be one of the other states that are not explained in the preferred embodiment.

Thus, in accordance with the present invention, the distributed shared memory multiprocessor system maintains the cache coherence based on the unidirectional ring bus by using the snooping scheme to thereby reduce the utilization of the ring and the memory access times.

While the present invention has been described with respect to certain preferred embodiments only, other modifications and variations may be made without departing from the spirit and scope of the present invention as set forth in the following claims.

What is claimed is:

1. A distributed shared memory multiprocessor system comprising:
    a group of processor nodes, wherein the processor nodes, each node including a storage, arc arranged in the form of a ring and one of the processor nodes generates a request signal for a data block, the remaining processor nodes snoop their own storages, and one of the remaining processor nodes provides the data block; and
    a ring bus for connecting the processor nodes in the form of the ring and providing a path through which the request signal is broadcast to each of the remaining processor nodes and the data block is provided to the processor node which has generated the request signal,
    wherein each of the processor nodes further includes:
        a plurality of processor modules for generating the request signal for the data block;
        a node controller for providing the data block corresponding to the request signal, wherein the node controller provides the data block corresponding to the request signal stored at a local shared memory or the remote cache of the processor node if the data block corresponding to the request signal is stored at the local shared memory or the remote cache of the processor node, and the node controller transmits the request signal via the ring bus if the data block corresponding to the request signal is not stored at the local shared memory or the remote cache of the processor node; provides the data block corresponding to the request signal to the processor module of the processor node which requires the data block if the data block corresponding to the request signal is provided from one of the remaining processor nodes; and examines whether the data block corresponding to the request signal is stored at its remote cache or the local shared memory and provides the data block if the request signal is provided from one of the remaining processor nodes; and
        a ring interface for connecting the node controller to the ring bus,
    wherein the storage contains:
        a local shared memory for storing data blocks, wherein the data blocks are shared by each of the processor modules; and
        a remote cache for storing the data block corresponding to the request signal, and
    wherein the local shared memory contains:
        a data memory for storing contents of the data block;
        a memory controller, connected to a local system bus, for providing the data block stored at the data memory to the local system bus if the request signal is provided from the local system bus; and
        a memory directory cache, connected to the node controller, for storing data on the state of the data block stored at the data memory.

2. The distributed shared memory multiprocessor system of claim 1, wherein the request signal contains a broadcast packet.

3. The distributed shared memory multiprocessor system of claim 1, wherein the request signal contains a unicast packet.

4. The distributed shared memory multiprocessor system of claim 1, wherein the data block corresponding to the request signal contains a unicast packet.

5. The distributed shared memory multiprocessor system of claim 1, wherein the ring bus is a unidirectional ring bus for connecting the processor nodes in one direction.

6. The distributed shared memory multiprocessor system of claim 1, wherein the ring bus is a bidirectional ring bus for connecting the processor nodes in two directions.

7. The distributed shared memory multiprocessor system of claim 1, wherein the memory directory cache includes two or more independent memory directories.

8. The distributed shared memory multiprocessor system of claim 7, wherein the plurality of processor modules and the node controller are connected to each other by the local system bus.

9. The distributed shared memory multiprocessor system of claim 8, wherein the plurality of processor modules and the node controller are connected by an interconnection network.

10. The distributed shared memory multiprocessor system of claim 9, wherein the local shared memory contains:
    a data memory for storing contents of the data block;
    a memory controller, connected to the interconnection network, for providing the data block stored at the data memory to the interconnection network if the request signal is provided from the interconnection network; and a memory directory cache, connected to the node controller, for storing data on the state of the data block stored at the data memory.

11. A distributed shared memory multiprocessor system comprising:

a group of processor nodes, wherein the processor nodes, each node including a storage, are arranged in the form of a ring and one of the processor nodes generates a request signal for a data block, the remaining processor nodes snoop their own storages, and one of the remaining processor nodes provides the data block; and a ring bus for connecting the processor nodes in the form of the ring and providing a path through which the request signal is broadcast to each of the remaining processor nodes and the data block is provided to the processor node which has generated the request signal, wherein each of the processor nodes further includes:
a plurality of processor modules for generating the request signal for the data block;
a node controller for providing the data block corresponding to the request signal, wherein the node controller provides the data block corresponding to the request signal stored at a local shared memory or the remote cache of the processor node if the data block corresponding to the request signal is stored at the local shared memory or the remote cache of the processor node, and the node controller transmits the request signal via the ring bus if the data block corresponding to the request signal is not stored at the local shared memory or the remote cache of the processor node; provides the data block corresponding to the request signal to the processor module of the processor node which requires the data block if the data block corresponding to the request signal is provided from one of the remaining processor nodes; and examines whether the data block corresponding to the request signal is stored at its remote cache or the local shared memory and provides the data block if the request signal is provided from one of the remaining processor nodes;
a ring interface for connecting the node controller to the ring bus; and
a pending buffer for storing information on a data block which is transmitted via the ring bus if it is not known whether the processor node requiring the data block has received the data block or not, wherein the storage contains:
a local shared memory for storing data blocks, wherein the data blocks are shared by each of the processor modules; and
a remote cache for storing the data block corresponding to the request signal.

12. A distributed shared memory multiprocessor system comprising:

a group of processor nodes, wherein the processor nodes, each node including a storage, are arranged in the form of a ring and one of the processor nodes generates a request signal for a data block, the remaining processor nodes snoop their own storages, and one of the remaining processor nodes provides the data block; and a ring bus for connecting the processor nodes in the form of the ring and providing a path through which the request signal is broadcast to each of the remaining processor nodes and the data block is provided to the processor node which has generated the request signal, wherein each of the processor nodes further includes:
a plurality of processor modules for generating the request signal for the data block;
a node controller for providing the data block corresponding to the request signal, wherein the node controller provides the data block corresponding to the request signal stored at a local shared memory or the remote cache of the processor node if the data block corresponding to the request signal is stored at the local shared memory or the remote cache of the processor node, and the node controller transmits the request signal via the ring bus if the data block corresponding to the request signal is not stored at the local shared memory or the remote cache of the processor node; provides the data block corresponding to the request signal to the processor module of the processor node which requires the data block if the data block corresponding to the request signal is provided from one of the remaining processor nodes; and examines whether the data block corresponding to the request signal is stored at its remote cache or the local shared memory and provides the data block if the request signal is provided from one of the remaining processor nodes, and
a ring interface for connecting the node controller to the ring bus, wherein the storage contains:
a local shared memory for storing data blocks, wherein the data blocks are shared by each of the processor modules; and
a remote cache for storing the data block corresponding to the request signal, wherein the remote cache contains:
a remote data cache for storing contents of the data block; and
a remote tag cache section for storing a tag address and a state of the data block stored at the remote data cache, and wherein the remote tag cache section is provided with two or more independent remote tag cache.

13. A distributed shared memory multiprocessor system comprising:

a group of processor nodes, wherein the processor nodes, each node including a storage, are arranged in the form of a ring and one of the processor nodes generates a request signal for a data block, the remaining processor nodes snoop their own storages, and one of the remaining processor nodes provides the data block; and a ring bus for connecting the processor nodes in the form of the ring and providing a path through which the request signal is broadcast to each of the remaining processor nodes and the data block is provided to the processor node which has generated the request signal, wherein each of the processor nodes further includes:
a plurality of processor modules for generating the request signal for the data block;
a node controller for providing the data block corresponding to the request signal, wherein the node controller provides the data block corresponding to the request signal stored at a local shared memory or the remote cache of the processor node if the data block corresponding to the request signal is stored at the local shared memory or the remote cache of the processor node, and the node controller transmits the request signal via the ring bus if the data block corresponding to the request signal is not stored at the local shared memory or the remote cache of the processor node; provides the data block corresponding to the request signal to the processor module of the processor node which requires the data block if the data block corresponding to the request signal is provided from one of the remaining processor nodes; and examines whether the data block corresponding to the request signal is stored at its remote cache or the local shared memory and provides the data block if the request signal is provided from one of the remaining processor nodes, and a ring interface for connecting the node controller to the ring bus, wherein the storage contains:
  a local shared memory for storing data blocks, wherein the data blocks are shared by each of the processor modules; and
  a remote cache for storing the data block corresponding to the request signal, and wherein the local shared memory contains:
  a data memory for storing contents of the data block;
  a memory controller, connected to the node controller, for providing the data block stored at the data memory to the node controller if the request signal is provided from the node controller; and
  a memory directory cache, corrected to the node controller, for storing data on the state of the data block stored at the data memory.

* * * * *